(12) United States Patent
Nov et al.

(10) Patent No.: US 6,571,684 B1
(45) Date of Patent: Jun. 3, 2003

(54) CROSSHEAD PISTON AND BEARING ASSEMBLIES

(75) Inventors: David Y. Nov, Laguna Niguel, CA (US); Anh Ngoc Pham, Lakewood, CA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 10 days.

(21) Appl. No.: 10/043,559

(22) Filed: Jan. 9, 2002

(51) Int. Cl.[7] .................................................. F16J 1/14
(52) U.S. Cl. .............................. 92/189; 92/187; 92/190; 92/157
(58) Field of Search .......................... 92/187, 189, 190, 92/157

(56) References Cited

U.S. PATENT DOCUMENTS

| | | | |
|---|---|---|---|
| 4,644,853 A | 2/1987 | Russell et al. | |
| 5,063,831 A | * 11/1991 | Byard | 92/187 |
| 5,072,654 A | 12/1991 | MacGregor | |
| 5,112,145 A | 5/1992 | MacGregor | |

* cited by examiner

Primary Examiner—Edward K. Look
Assistant Examiner—Michael Leslie
(74) Attorney, Agent, or Firm—Howard & Howard

(57) ABSTRACT

A crosshead piston assembly has a piston body with an upper head portion formed with a plurality of piston rings and a lower stem portion formed with a pin bore. The pin bore has a pair of lower, laterally spaced mounting ears presenting a bearing support surface interrupted by a lateral gap between the ears. A saddle is arranged opposite the ears and provides a bearing support surface which is continuous along the pin bore. A three-piece slipper bearing set is disposed in the pin bore and includes a pair of lower bearing shells seated in the ears and an upper bearing shell seated in the saddle. The upper bearing shell and saddle are formed with aligned oil supply and retaining holes. The oil supply hole is maintained fully open, while a retaining pin is installed in the aligned retention holes to support the upper bearing shell against movement relative to the saddle.

15 Claims, 3 Drawing Sheets

CROSSHEAD PISTON AND BEARING ASSEMBLIES

BACKGROUND OF THE INVENTION

1. Technical Field

This invention relates to crosshead piston assemblies used in heavy duty diesel engine applications and to the three-piece bearing inserts of such pistons used to support the wrist pins.

2. Related Art

U.S. Pat. No. 4,644,853 discloses a crosshead piston assembly having a three-piece insert bearing used to support the piston pin carried at the end of a connecting rod. The upper half bearing portion is formed with an oil supply hole which is aligned with an oil supply hole formed in the upper saddle portion of the piston for supplying oil issuing from a passage in the piston pin up into an oil cooling space below the head of the piston for cooling the head during use. The bearings are retained against movement by engagement at their edges with retaining shoulder portions of the piston projecting between the facing edges of the upper and lower bearing sets.

U.S. Pat. No. 5,072,654 discloses a similar crosshead piston arrangement, but which dispenses with retaining shoulders in favor of a hollow retaining pin installed in the aligned oil supply holes of the upper bearing and saddle portions or by outwardly turned tab portions formed as a collar extending into the oil supply passage of the saddle portion or as tabs carried at the ends of the upper bearing portion which are received into notches machined in the piston body. The installation of any bearing retaining feature in the oil supply passages of the upper bearing portion and saddle portion, either in the form of inserts or integral collar portions, has the effect of restricting the size of the opening and thus may impede the flow of oil through the passage, reducing the cooling effect that might otherwise be maximized if the passage were free from obstruction of bearing retaining features. The alternative of forming tab portions at the ends of the bearings which fit into machined recesses in the piston adds cost and complexity to the manufacturer of pistons and bearing assemblies.

Accordingly, there is a need in the industry for further alternatives to retaining the bearing sets without obstructing the free flow of cooling oil to the head of the piston and without complicating the manufacture of the bearings and piston body such as by inter fitting tabs and recesses of the bearings and piston body.

SUMMARY OF THE INVENTION AND ADVANTAGES

According to a first aspect of the invention, a piston assembly is provided having a piston body formed with an upper head portion having a plurality of ring grooves and a lower stem portion extending downwardly from the head portion along a longitudinal axis of the body. The lower stem portion is formed with a transverse pin bore which extends between laterally opposite outer surfaces of the lower stem portion. The lower stem portion also includes a pair of mounting ears having laterally inner surfaces which are spaced from one another across a gap between the ears. The ears present lower concave bearing support surfaces which are likewise interrupted by the gap. The lower stem portion also includes an upper concave bearing support surface which is arranged opposite the lower bearing support surfaces and extends continuously between the laterally outer surfaces of the lower stem portion. The upper bearing support surface is formed with an oil supply hole about midway between the laterally outer surfaces of the lower stem portion. The oil supply hole opens to an oil cooling space for accommodating a flow of cooling oil to the upper head portion of the piston body. A three-piece slipper bearing set is disposed in the pin bore, including a pair of lower portions supported by the lower bearing support surfaces of the ears and a separate upper bearing portion supported by the upper bearing support surface and extending continuously between the laterally outer surfaces of the lower stem portion. The upper bearing portion is formed with an oil supply hole which is aligned with the oil supply hole of the bearing support surface for accommodating the flow of oil. A wrist pin is disposed in the pin bore and is supported by the three-piece slipper bearing set. The wrist pin has an oil supply hole which is aligned with the oil supply holes of the upper bearing portion and upper bearing support surface. The oil supply holes are free and unencumbered by any bearing retention structure which would operate to support the upper bearing portion against movement relative to the upper bearing support surface. The invention is characterized by including aligned retaining holes formed in the upper bearing support surface and the upper bearing portion in spaced relation to the oil supply holes, and a retention pin disposed in the aligned retaining holes to support the upper bearing portion against movement relative to the upper bearing support surface independently of the oil supply holes.

According to a further aspect of the invention, such a three-piece sliding bearing set is contemplated separate from the piston structure having the central oil supply hole formed in the upper section of the bearing set together with a second bearing retention hole formed in the upper section of the bearing set in spaced relation to the oil supply hole.

The piston and bearing assemblies according to the invention have the advantage of providing a simple way of retaining the three-piece bearing set within the pin bore of a crosshead piston without encumbering the oil passage hole used to deliver cooling oil to the head of the piston, and without complicating the design and manufacture of the bearings and piston body through provision of added tab projections on the bearings and recesses machined in the piston body.

The simple solution provided by the invention is to maintain the oil supply holes in their fully opened, unencumbered condition, and to retain the upper bearing section by means of the formation of a set of aligned retention holes in the upper bearing section and its support surface spaced from the oil supply hole and in which a retention pin is disposed for retaining the upper bearing section against movement relative to the support surface without obstructing the central supply passage through the bearing and upper support surface leading to the cooling space beneath the upper head portion of the piston.

Another advantage of the present invention is that it provides a simple solution for securing the three-piece bearing set within a crosshead piston body without complicating the manufacture of either the bearing or head. According to the invention, all that is required is to provide at least one additional opening through the upper bearing portion aligned with an opening formed in the adjacent support surface to receive a simple retainer pin, which may be installed from below in the gap between the mounting ears of the piston body before or after the lower bearing portions are seated. As such, there is no need to provide additional

THE DRAWINGS

These and other features and advantages of the present invention will become more readily appreciated when considered in connection with the following detailed description and appended drawings, wherein.

DETAILED DESCRIPTION

Figure 1:
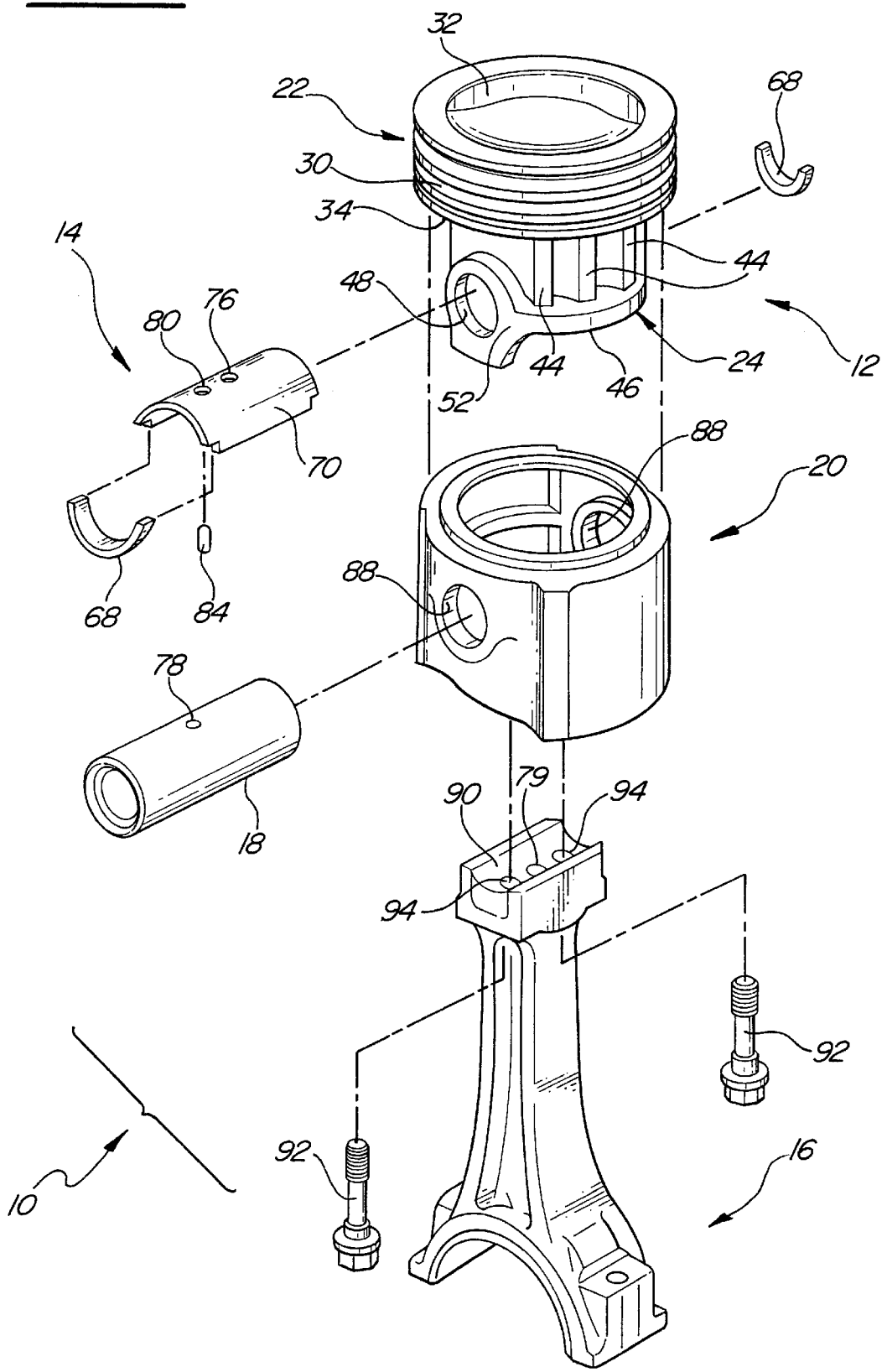
FIG. 1 is an exploded perspective view of a piston, skirt and connecting rod assembly according to the invention.

A cross-head piston assembly according to a presently preferred embodiment of the invention as shown generally at 10 in FIG. 1 and comprises a piston body 12 which mounts a three-piece bearing assembly or set 14 and coupled by a connecting rod 16 and cross pin or wrist pin 18 to an articulated piston skirt 20.

The piston body 12 is preferably fabricated of a one-piece cast ductile iron and includes an upper crown or head portion 22 and a lower crown or stem portion 24.

Figure 2:
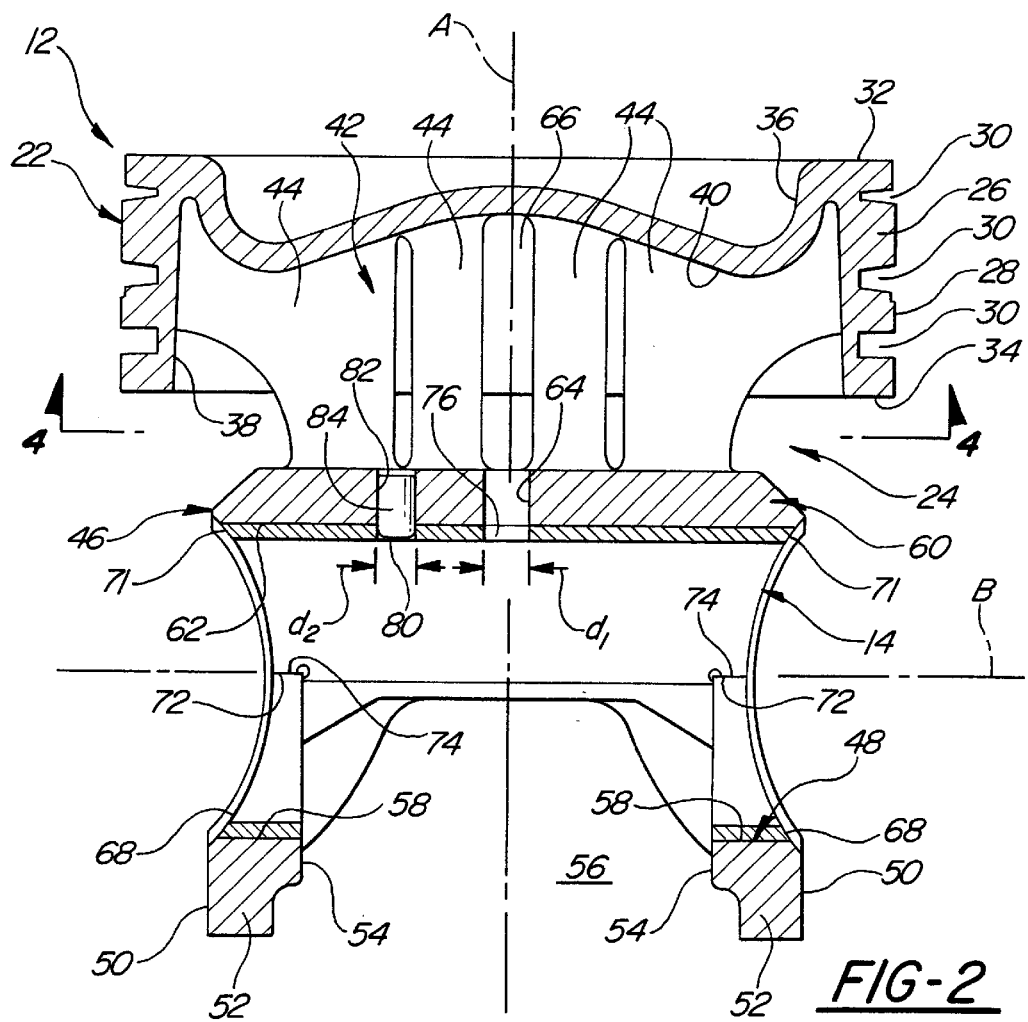
FIG. 2 is an enlarged fragmentary cross-sectional view of the piston body with the bearing installed.

Referring additionally to FIG. 2, the head portion 22 includes a generally cylindrical wall 26 having an outer surface 28 in which a plurality of circumferentially continuous ring grooves 30 are machined. The piston body 12 has a longitudinal axis A and the outer surface 28 extends longitudinally between an upper surface 32 and a lower surface 34 of the piston head 22. A combustion bowl 36 is machined into the upper surface 32. The cylindrical wall 26 has a cylindrical inner surface 38 which blends into an underside surface 40 extending beneath the combustion bowl 36 and defining an open-bottom space 42 within the piston head 22 for receiving cooling oil therein to cool the piston head 22 during operation which is exposed to the heat of combustion.

Figure 4:
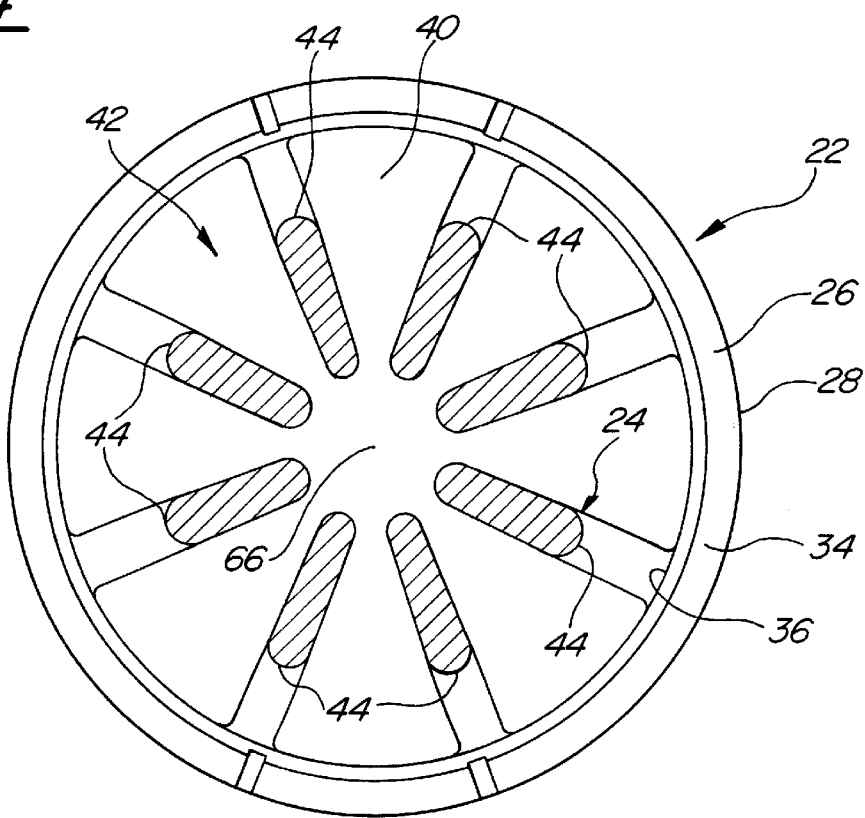
FIG. 4 is a cross-sectional view taken along lines 4—4 of FIG. 2.

The lower stem portion 24 is formed as one piece with the upper head portion 22 and includes a plurality of radially extending, circumferentially spaced connecting ribs 44 (see additionally FIG. 4) which extend from the underside surface 40 at their upper ends and are fixed at their lower ends to a pin boss region 46. The pin boss region 46 is formed with a pin bore 48 which extends laterally across the piston body 12 along a transverse pin bore axis B between laterally opposite, outer surfaces 50 of the piston body 12. The pin boss region 46 includes a pair of mounting ears 52 having laterally inner surfaces 54 which face one another and are spaced across a lateral gap 56 there between. The mounting ears 52 are formed with lower concave bearing support surfaces 58 which extend laterally between the outer surface 50 and inner surface 54 of each ear 52, such that the support surfaces 58 are interrupted across the gap 56. The concave support surfaces 58 are generally semi-cylindrical in shape and face upwardly toward the piston head 22.

The pin boss region 46 of the lower stem portion 24 further includes a downwardly opening saddle section 60 arranged opposite the mounting ears 52 in presenting an upper bearing support surface 62 which is concave and arranged opposite the lower bearing support surfaces 58. The upper bearing support surface 62 extends continuously between the outer surfaces 50 of the lower stem portion 24 such that it spans, uninterrupted, across the gap 56 along at least a portion of the surface 62 between the outer surfaces 50. The construction of the bearing support surfaces 58, 62 are substantially the same as those disclosed in previously mentioned U.S. Pat. No. 5,072,654, the disclosure of which is incorporated herein by reference.

The upper bearing support surface 62 is formed with an oil supply hole 64 that extends through the saddle 60 from the upper bearing support surface 62 through the wall of the saddle 60 and communicates with the oil cooling space 42 of the piston head 22. The oil supply hole 64 is located generally midway between the outer surfaces 50, and preferably in line with the longitudinal axis A as best shown in FIG. 2, so as to direct cooling oil passing upwardly through the oil supply hole 64 into a central open region 66 surrounded by the radial connecting ribs 44 (see FIGS. 2, 4 and 5).

Figure 3:
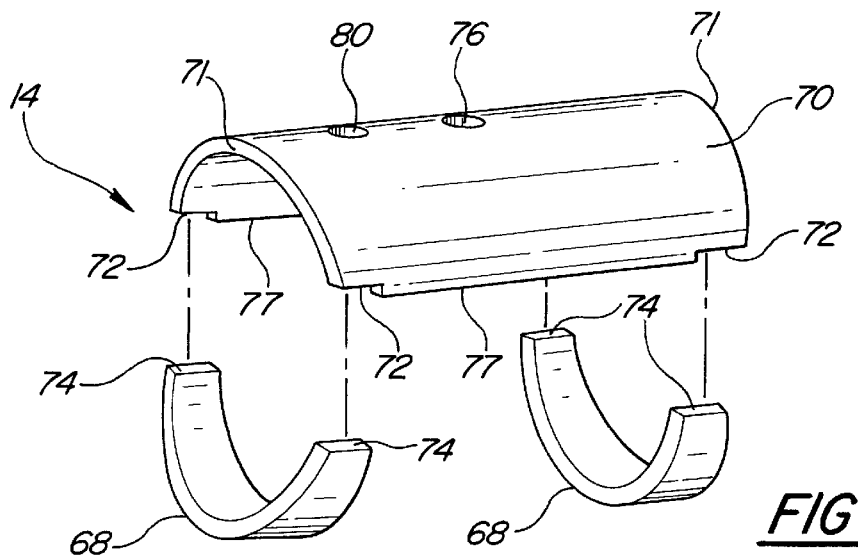
FIG. 3 is an exploded perspective view of the three-piece bearing set of the invention.

The three-piece slipper bearing set 14 is disposed within the pin bore 48 so as to line the lower and upper bearing support surfaces 58, 62, as best illustrated in FIG. 2. Referring additionally to FIG. 3, the bearing set 14 includes a pair of lower bearing half shells 68 each having a generally semi-circular shell configuration configured to seat snuggly in the lower bearing support surfaces 58 of the mounting ears 52, as illustrated in FIG. 2, so as to extend generally between the outer 50 and inner 54 surfaces of each mounting ear for lining the lower bearing support surface 58. The three-piece bearing set 4 includes an upper bearing portion 70 having a generally arcuate, shell configuration with a shape and size relative to the saddle 60 and lower bearing shells 68 to enable the upper bearing shells 70 to seat snuggly against the upper bearing support surface 62 opposite the lower bearing shells 68 as shown in FIG. 2. The upper bearing shell 70, when installed in to pin bore 48, extends continuously between the outer surfaces 50 of the lower stem portion 24 in the same general manner as that of the upper bearing support surface 62 so as to line the upper bearing support surface 62. It will be appreciated from FIGS. 2 and 3 that the characterization of the upper bearing shell 70 and upper bearing support surface 62 as being continuous means that they extend at least in part without any interruption between their opposite ends 71, and generally between, although necessary precisely, the lateral outer surfaces 50 of the stem portion 24 (i.e. the upper bearing shell 70 may be recessed slightly inward of the surfaces 50 while still extending continuously between the ends 71 of the bearing shell 70 and spanning the lateral gap 56, unlike the lower bearing shell sections 68). The bearing shells 68, 70 are the same general shape and contour as those disclosed in U.S. Pat. No. 5,072,654 which has been incorporated herein by reference, and as such the upper bearing shell 70 includes notches 72 adjacent its opposite ends which are sized to nest with the ends 74 of the lower bearing shells 68 as best shown in FIGS. 2 and 3.

The upper and lower bearing shells 68, 70 are of the sliding bearing-type in which a relatively soft bearing metal material is applied to the inner concave surface of a rigid metal backing shell of steel or the like. While not intending to limit the invention to any particular type of sliding bearing, one suitable example would include a copper-tin bearing layer applied to a steel backing of the shells 68, 70 to provide a suitable bearing surface for the cross pin 18. The specific shape and configuration of the inner running surface of the bearing shells 68, 70 may be the same or similar as that disclosed in previously incorporated U.S. Pat. No. 5,072,654, and as such details concerning the particular shape of the bearing shells 68, 70 can be found in this incorporated reference.

Figure 5:
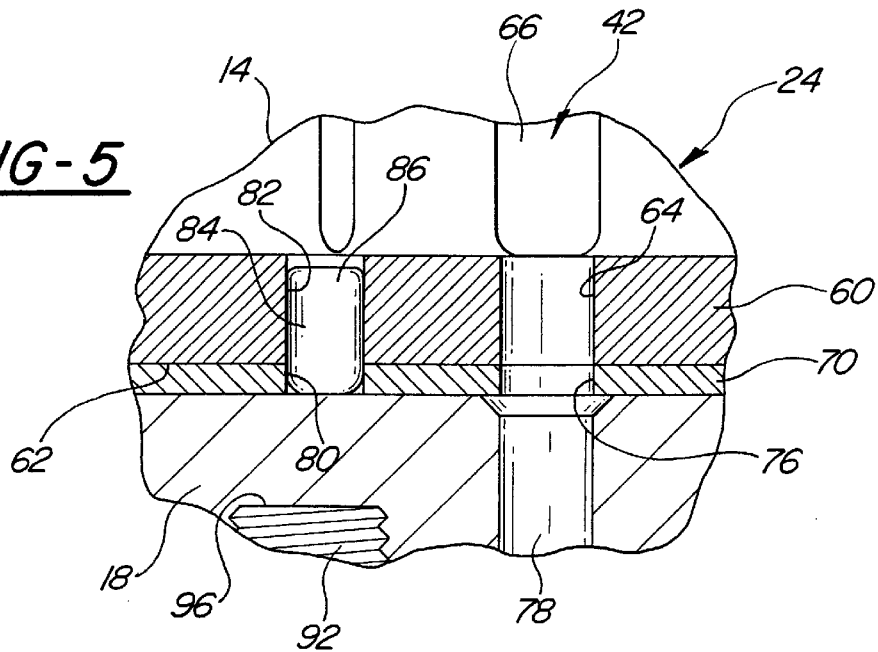
FIG. 5 is an enlarged fragmentary sectional view showing a portion of the piston and bearing assemblies.

Referring further to FIGS. 2, 3 and 5, it will be seen that the upper bearing shell 70 is formed with a central oil supply hole 76 which is generally positioned midway between the ends of the upper bearing shell and midway between its edges 77 in alignment with the oil supply hole 64 of the upper bearing support surface 62. When the upper bearing shell 70 is installed in the pin bore 48, the oil supply hole 76 is preferably aligned with the axis A of the piston, forming an extension of the oil supply hole 64 of the upper bearing support surface 62. As shown best in FIG. 5, the oil supply holes 64, 76 are aligned and communicate with an oil supply hole or passage 78 extending through the wrist pin 18, which in turn communicates with an oil supply passage 79 of the connecting rod 16 for delivering a supply of cooling oil from the passage of the connecting rod 16 through the oil supply holes 78, 76, and 64 and into the open cooling space 42 of the piston body 12 for cooling the piston head 22 during operation of the piston assembly 10.

As illustrated best in FIGS. 2, 3 and 5, the upper bearing shell 70 is formed with at least one additional hole 80 that serves as a retaining hole. The hole 80 is spaced from the oil supply hole 76 in preferably laterally offset relation so as to be spaced closer to one end 71 of the upper shell 70 than to its opposite end 71. The retaining hole 80 is preferably spaced midway between the opposite edges 77 of the upper shell 70 so as to be positioned at the apex of the shell laterally adjacent the oil supply hole 64. An associated retaining hole 82 is formed in the upper bearing support surface 58 in laterally spaced adjacent relationship to the oil supply hole 64 and aligned with the retaining hole 80, as shown in FIGS. 2 and 5, when the oil supply holes 64, 76 are aligned. The retaining hole 82 extends preferably through the wall of the saddle 60 so as to open to the cooling space 42 beneath the piston head 22. A retention pin 84 is disposed in the aligned retaining holes 80, 82 and acts between the upper bearing shell 70 and the saddle 60 of the lower stem portion 24 to support the upper bearing shell 70 against movement relative to the upper bearing support surface 62. The retaining pin 84 is thus received in both the retaining hole 80 of the shell and the retaining hole 82 of the saddle 60 and is sized for a snug fit with the wall of the opening 82 to prevent lateral movement of the upper bearing shell 70 in the direction of axis B and relative rotation about axis B relative to the upper bearing support surface 62. The retaining pin 84 may be solid in cross section so as to block the flow of cooling oil through the aligned holes 80, 82. Alternatively, the pin 84 may have a hollow center which would serve to communicate gravity fed oil from the space 42 to the interface running surfaces between the upper bearing shell 70 and wrist pin 18 to provide supplemental lubrication to these surfaces during operation.

It will be seen from FIGS. 2 and 5 that the upper bearing shell 70 is retained in place by the retention pin 84 without obstructing the oil supply holes 64, 76. With provision of the offset retaining pin 84, the oil supply holes 64, 76 are fully opened and unobstructed by any bearing retaining structure which would operate to support the upper bearing shell 70 against movement relative to the upper bearing support surface 58. In this way, the retaining structure of the bearing does not reduce or interfere with the flow of oil through the passages 64, 76 so as to achieve the maximum flow of cooling oil into the space 42 through the fully opened oil supply passages 64, 76.

As shown in FIG. 5, the wrist pin 18 extends across and covers the aligned retaining holes 80, 82, such that there is no oil supply to the retaining holes 80, 82 from any passage in the cross pin 18. The retention pin 84 is preferably sized for a snug, self-supporting fit within the retaining hole 82, such that the outer surface of the retention pin 84 engages the inner wall surface of the retaining hole 82. A leading insertion end 86 of the retaining pin 84 is preferably tapered, and more preferably both ends are tapered, for facilitating easy insertion and guidance of the pin 84 into the aligned holes 80, 82. As shown best in FIGS. 2 and 5, the aligned oil supply holes 64, 76 have a predetermined diameter $d_1$ which is relatively greater than the diameter $d_2$ of the aligned retaining holes 80, 82. The relative size maximizes the volume of the oil supply holes 64, 76 while minimizing that of the retention pin 84 and aligned retaining holes 80, 82 so as to provide the needed support of the upper bearing shell 70 while maintaining maximum flow of oil through the oil supply holes 64, 76. The difference in size also precludes the retaining pin 84 from being inadvertently installed in the oil supply holes 64, 76.

The components of FIG. 1 are assembled in the following manner. The pin 84 is installed with a snug fit within the opening 82. The three piece bearing set 14 is installed in the pin bore 48 and secured by the retention pin 84. The skirt 20 is fit over the lower stem portion 24, with opposing pin holes 84 of the skirt aligned with the pin bore 48 of the piston body 12. The cross pin 18 is inserted through the skirt 20 and body 12 and supported from below in a seat 90 of the upper end of the connecting rod 16 positioned with the oil supply passage 79 aligned with the oil supply holes 64, 76 and 78. The upper end of the connecting rod 16 is fixed to the cross pin 18 by means of fasteners 92 extending through openings 94 in the connecting rod 16 and received in threaded blind passage 96 of the cross pin 18 (one shown in FIG. 5) arranged on laterally opposite sides of the oil supply passage 78 of the cross pin 18.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A piston assembly, comprising:

a piston body having an upper head portion formed with a plurality of ring grooves, a lower stem portion extending downwardly from said head portion along a longitudinal axis of said body, a pin bore formed in said lower stem portion extending along a pin bore axis transverse to said longitudinal axis between laterally opposite outer surfaces of said lower stem portion, said lower stem portion including a pair of mounting ears having laterally inner surfaces spaced laterally from one another across a lateral gap therebetween, said mounting ears presenting respective lower concave bearing support surfaces extending between said laterally opposite outer surfaces of said stem and each associated said laterally inner surface of said mounting ears such that said lower bearing support surfaces are discontinuous across said lateral gap, said lower stem portion including an upper concave bearing support surface disposed longitudinally opposite and facing said lower concave bearing support surfaces of said mounting ears and extending continuously between said laterally opposite outer surfaces of said lower stem portion so as to span said lateral gap between said mounting ears; said upper concave bearing support surface including an oil supply hole formed centrally between said laterally outer surfaces of said lower stem portion and opening to an oil cooling space disposed longitudinally above said upper bearing support surface for accommodating a flow of cooling oil through said oil supply hole for cooling said upper head portion of said piston body;

a three-piece slipper bearing set disposed in said pin bore, said three-piece bearing set including a pair of lower bearing portions supported by said lower concave bearing support surfaces and a separate upper bearing portion supported by said upper bearing support surface and extending continuously between said laterally outer surfaces of said lower stem portion, said upper bearing portion having an oil supply hole aligned with said oil supply hole of said upper bearing support surface;

a wrist pin disposed in said pin bore and supported by said three-piece slipper bearing set, said wrist pin having an oil supply hole aligned with said oil supply holes of said upper bearing portion and said upper bearing support surface, said oil supply holes being free and unencumbered by any bearing retention structure which would operate to support said upper bearing portion against movement relative to said upper bearing support surface; and aligned retaining holes formed in said upper bearing support surface and said upper bearing portion in spaced relation to said oil supply holes, and a retention pin disposed in said aligned retaining holes supporting said upper bearing portion against movement relative to said upper bearing support surface independently of said oil supply holes.

2. The assembly of claim 1 wherein said wrist pin extends across and covers said aligned retaining holes and said retention pin.

3. The assembly of claim 1 wherein said retention pin is self-supporting within said aligned retaining holes.

4. The assembly of claim 1 wherein said aligned retaining holes are spaced axially inwardly of said laterally outer surfaces of said lower stem portion of said piston body.

5. The assembly of claim 4 wherein said aligned retaining holes are spaced further toward one of said laterally outer surfaces than the other of said laterally outer surfaces.

6. The assembly of claim 1 wherein said retention pin is solid and blocks passage of fluid therethrough.

7. The assembly of claim 1 wherein said retention pin is substantially cylindrical in shape and includes a tapered insertion end.

8. The assembly of claim 1 wherein said retaining hole formed in said upper bearing support surface extends into said oil cooling space.

9. The assembly of claim 1 wherein said oil supply holes of said upper bearing support surface and said upper bearing portion are defined by exposed walls of said lower stem portion and said upper bearing portion, respectively.

10. The assembly of claim 1 wherein said upper and said lower bearing portions have abutting edges.

11. The assembly of claim 1 wherein said retaining hole of said upper bearing portion has a diameter smaller than that of said oil supply hole.

12. The assembly of claim 1 wherein said retaining hole of said upper bearing support surface is disposed laterally inwardly of said laterally inner surfaces of said mounting ears.

13. A three-piece sliding bearing set for a crosshead piston, said three-piece bearing set comprising:

a pair of lower half shell sections having an arcuate shape presenting a pair of associated concave running surfaces and each having a predetermined length measured between opposite ends of said lower half shell sections;

an upper half shell section having an arcuate shape presenting a concave running surface and having a length measured between opposite ends of said upper half shell section that is greater than the combined lengths of said lower half shell sections; and a first oil supply hole formed in said upper half shell section located centrally between said ends, and a second bearing retention hole formed in said upper half shell section in spaced relation to said oil supply hole.

14. The three-piece bearing set of claim 13 wherein said bearing retention hole has a diameter relatively smaller than that of said oil supply hole.

15. The three-piece bearing set of claim 13 wherein said bearing retention hole is spaced nearer to one of said opposite ends of said upper half shell than to the other of said opposite ends.

* * * * *